US008964592B2

(12) United States Patent
Fujita (10) Patent No.: US 8,964,592 B2
(45) Date of Patent: Feb. 24, 2015

(54) WIRELESS TERMINAL DEVICE, WIRELESS COMMUNICATION SYSTEM AND CONTROL METHOD FOR WIRELESS TERMINAL DEVICE

(71) Applicant: Fujitsu Limited, Kawasaki-shi, Kanagawa (JP)

(72) Inventor: Hiroshi Fujita, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 142 days.

(21) Appl. No.: 13/851,777

(22) Filed: Mar. 27, 2013

(65) Prior Publication Data

US 2013/0286870 A1    Oct. 31, 2013

(30) Foreign Application Priority Data

Apr. 26, 2012 (JP) .................................. 2012-101770

(51) Int. Cl.
| | |
|---|---|
| *H04L 12/26* | (2006.01) |
| *H04M 1/00* | (2006.01) |
| *H04W 24/02* | (2009.01) |
| *H04W 40/08* | (2009.01) |
| *H04W 84/18* | (2009.01) |

(52) U.S. Cl.
CPC .............. *H04W 24/02* (2013.01); *H04W 40/08* (2013.01); *H04W 84/18* (2013.01)
USPC .......................................... 370/252; 455/561

(58) Field of Classification Search
None
See application file for complete search history.

(56) References Cited

U.S. PATENT DOCUMENTS

| | | | |
|---|---|---|---|
| 2009/0116407 A1 | 5/2009 | Ishii | |
| 2009/0147867 A1* | 6/2009 | Okamoto et al. ............. | 375/260 |
| 2010/0254284 A1 | 10/2010 | Otani et al. | |
| 2012/0093253 A1* | 4/2012 | Park et al. ..................... | 375/285 |
| 2012/0208599 A1* | 8/2012 | Tanaka .......................... | 455/561 |

FOREIGN PATENT DOCUMENTS

| | | |
|---|---|---|
| JP | 2003-258811 A | 9/2003 |
| JP | 2008-206124 A | 9/2008 |
| WO | WO 2008/132808 A1 | 11/2008 |

\* cited by examiner

*Primary Examiner* — Afshawn Towfighi
(74) *Attorney, Agent, or Firm* — Arent Fox LLP (57) ABSTRACT

A wireless terminal device includes: a processor connected to a memory, configured to: acquire an estimated reception sensitivity of the wireless terminal device based on reception powers from a plurality of other wireless terminal devices with which the wireless terminal device performs random access communication, notify the other wireless terminal devices of the estimated reception sensitivity of the wireless terminal device, and select a transmission destination from among the other wireless terminal devices based on requested reception powers of the other wireless terminal devices, the requested reception powers being calculated based on estimated reception sensitivities of the other wireless terminal devices notified from the other wireless terminal devices.

13 Claims, 10 Drawing Sheets

WIRELESS TERMINAL DEVICE, WIRELESS COMMUNICATION SYSTEM AND CONTROL METHOD FOR WIRELESS TERMINAL DEVICE

CROSS-REFERENCE TO RELATED APPLICATION

This application is based upon and claims the benefit of priority from the prior Japanese Patent Application No. 2012-101770 filed on Apr. 26, 2012, the entire contents of which are incorporated herein by reference.

FIELD

The embodiments discussed herein relate to wireless terminal devices, wireless communication systems and control methods for wireless terminal devices.

BACKGROUND

In recent years, the use of sensor networks for monitoring various kinds of information in order to manage for example residential environments, nature conservation, healthcare and traffic conditions has been increasing. In sensor networks, sensors having a communication function (hereafter, referred to as "sensor terminal devices") are placed at various locations and the sensor terminal devices autonomously form a network. These sensor terminal devices perform wireless communication with sensor terminal devices in the surrounding area by using a random access scheme. Random access communication is a type of communication in which, when data that is to be transmitted is generated, the data is transmitted from the terminal device that generated the data to another terminal device. Examples of random access communication schemes include a carrier sense multiple access/collision avoidance (CSMA/CA) scheme. In this scheme, a sensor terminal device specifies a terminal to transmit data to from among sensor terminal devices in the surrounding area and selects a communication path in accordance with a given communication path selection method. In this way, sensor terminal devices within a sensor network form a wireless multi-hop network. A wireless multi-hop network is a wireless network in which nodes have a function of forwarding data and in which nodes, which are not able to directly communicate with each other, can communicate with each other via nodes interposed therebetween. Each sensor terminal device transmits data to the specified device by using multiple hops. Wireless multi-hop networks are sometimes also called ad hoc networks.

A very large number of wireless terminal devices are used in wireless multi-hop networks such as sensor networks in order to obtain detailed target information. When a network is formed using a very large number of wireless terminal devices, it is desirable that it be possible to purchase the individual wireless terminal devices at a low cost. However, in the manufacture of wireless terminal devices, the individual wireless terminal devices are generally subjected to testing before being shipped out.

In order to reduce costs, wireless terminal devices manufactured at low cost are often only subjected to simple testing. Consequently, there is a risk of there being large manufacturing variations among wireless terminal devices manufactured at low cost. For example, it is thought that reception sensitivity varies greatly among wireless terminal devices manufactured at low cost. Here, reception sensitivity is an index that indicates the minimum reception power at which the reception quality requested for communication can be secured and this minimum reception power is called the "reception sensitivity point". Wireless terminal devices having a low reception sensitivity point, that is, a high reception sensitivity, are capable of detecting signals at even a small reception power, whereas, it is difficult for wireless terminal devices having a low reception sensitivity to detect signals at a small reception power. Consequently, a situation may occur in which bidirectional communication is difficult between a wireless terminal device in which the reception power is equal to or greater than a reception sensitivity point and another wireless terminal device in which the reception power is less than the reception sensitivity point, despite there being a link therebetween.

In the field of wireless multi-hop networks, the following technologies have been proposed. For example, a related technology has been proposed in which, when a certain terminal is to go offline, the certain terminal searches for a proxy terminal to serve as a substitute for itself and, upon finding such a terminal, the certain terminal instructs the proxy terminal to serve as a substitute for itself. In addition, another related technology has been proposed in which entry permission can be issued to a terminal wishing to newly enter a network by any terminal within an ad hoc network. Yet another related technology has been proposed in which a terminal already placed on a network performs a participation procedure for a terminal that is to be newly placed on the network and assigns a network address to the new terminal.

Japanese Laid-open Patent Publication No. 2003-258811, International Publication Pamphlet No. WO 2008/132808 and Japanese Laid-open Patent Publication No. 2008-206124 disclose examples of the related art.

SUMMARY

According to an aspect of the invention, a wireless terminal device includes: a processor connected to a memory, configured to: acquire an estimated reception sensitivity of the wireless terminal device based on reception powers from a plurality of other wireless terminal devices with which the wireless terminal device performs random access communication, notify the other wireless terminal devices of the estimated reception sensitivity of the wireless terminal device, and select a transmission destination from among the other wireless terminal devices based on requested reception powers of the other wireless terminal devices, the requested reception powers being calculated based on estimated reception sensitivities of the other wireless terminal devices notified from the other wireless terminal devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereafter, embodiments of a wireless terminal device, a wireless communication system and a control method for a wireless terminal device disclosed in this application will be described in detail with reference to the drawings. However, a wireless terminal device, a wireless communication system and a control method for a wireless terminal device are not limited to the below-described embodiments. Although a sensor network will be specifically described hereafter as an example of a wireless multi-hop network, any other kind of system may be used so long as the system forms a wireless multi-hop network.

While inventing the present embodiments, observations were made regarding a related art. Such observations include the following, for example.

In wireless multi-hop networks of the related art in which no particular measures have been taken to deal with manufacturing variations, it is difficult to establish bidirectional communication with certainty when low-cost wireless terminal devices are used. Consequently, the speed with which a network is formed is reduced and it is difficult to obtain sufficient functionality as a wireless multi-hop network.

In addition, regarding the related technology in which a terminal is instructed to serve as a substitute for a terminal that is to go offline, the reception sensitivity of each device is measured and stored in the device prior to shipping in order to allow the device to transmit reception sensitivity information to other terminal devices, and this makes it difficult to reduce the manufacturing cost of the devices. The same problem occurs in the related technology in which entry permission is issued to a terminal wishing to newly enter a network by any terminal within an ad-hoc network and in the related technology in which a terminal performs a participation procedure for a terminal to be newly placed on a network.

The technology of the embodiments discussed herein was made in light of the above-described circumstances and an object thereof is to provide a wireless terminal device, a wireless communication system and a control method for a wireless terminal device with which bidirectional communication is established with certainty in wireless terminal devices that perform random access communication.

Embodiment 1

Figure 1:
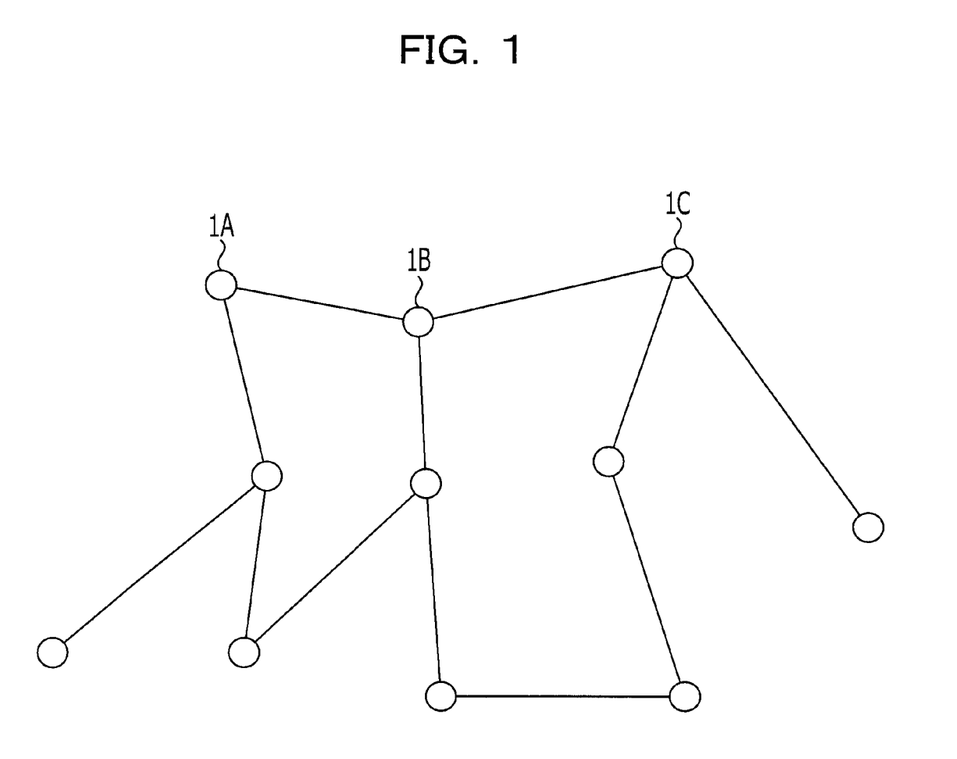
FIG. 1 is a diagram of the configuration of a sensor network.

FIG. 1 is a diagram of the configuration of a sensor network. The sensor network illustrated in FIG. 1 forms a wireless multi-hop network. Each circle in FIG. 1 represents a sensor terminal device. For example, sensor terminal devices 1A to 1C are illustrated in FIG. 1. Hereafter, the sensor terminal devices will be simply referred to as "sensor terminal devices 1" when they are not being particularly differentiated from each other. Lines connecting the individual sensor terminal devices 1 represent communication paths. The individual sensor terminal devices 1 are capable of performing communication with sensor terminal devices 1 linked thereto via communication paths and form a wireless multi-hop network in which data is transmitted using these communication paths. For example, the sensor terminal device 1A transmits data to the sensor terminal device 1C by relaying the data through the sensor terminal device 1B. Each sensor terminal device 1 performs wireless communication with another sensor terminal device 1 by using a random access communication scheme (hereafter, referred to as "random access communication").

Figure 2:
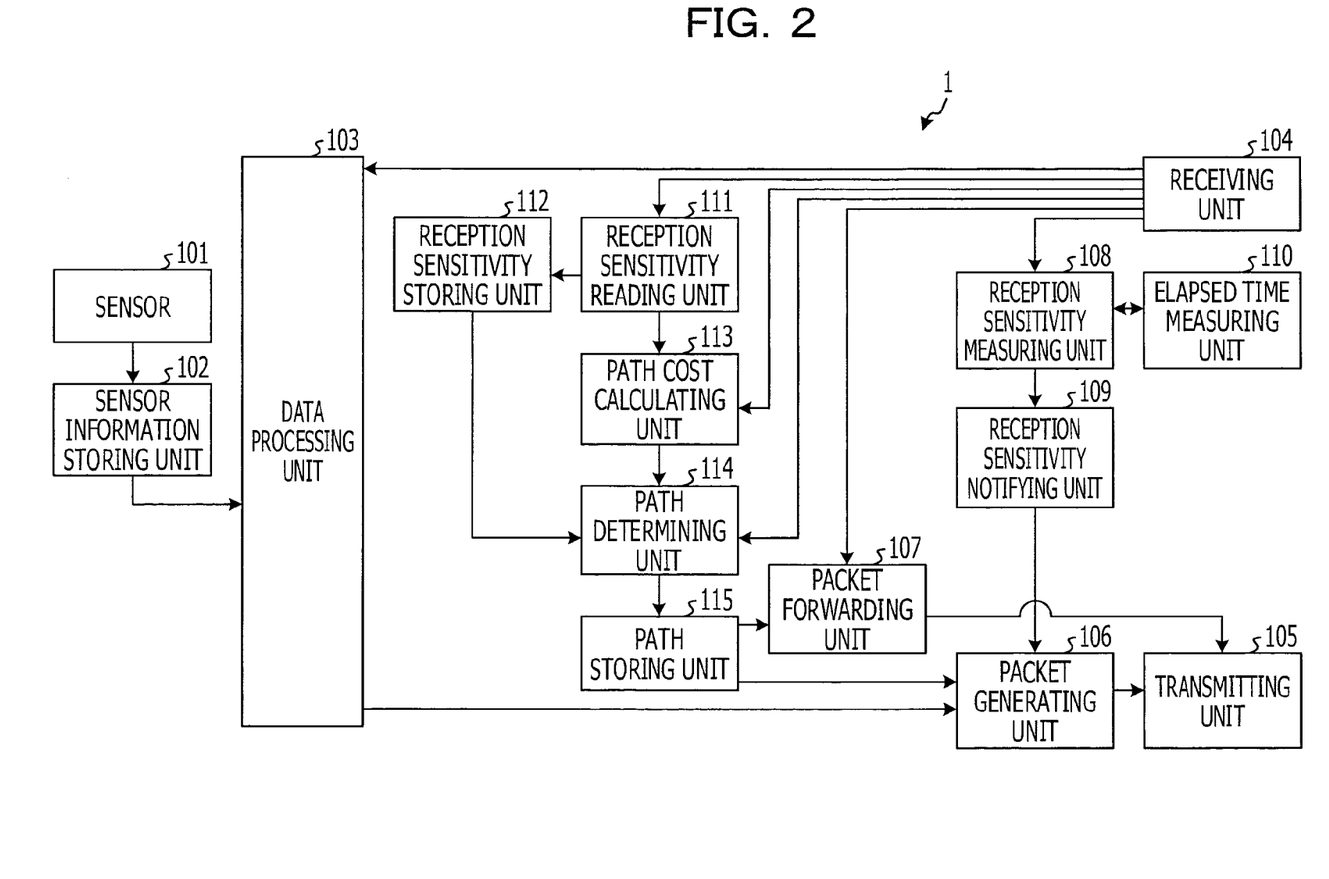
FIG. 2 is a block diagram of a wireless terminal device according to Embodiment 1.

FIG. 2 is a block diagram of a wireless terminal device according to Embodiment 1. The sensor terminal device 1 according to this embodiment includes a sensor 101, a sensor information storing unit 102, a data processing unit 103, a receiving unit 104, a transmitting unit 105, a packet generating unit 106 and a packet forwarding unit 107. In addition, the sensor terminal device 1 further includes a reception sensitivity measuring unit 108, a reception sensitivity notifying unit 109, an elapsed time measuring unit 110, a reception sensitivity reading unit 111, a reception sensitivity storing unit 112, a path cost calculating unit 113, a path determining unit 114 and a path storing unit 115.

The sensor 101, for example, senses temperature or humidity. Here, in this embodiment, temperature or humidity is sensed as an example of information to be sensed, but so long as the information is information that can be sensed, the information is not limited to this. For example, the information that is to be sensed may instead be biological information or door open/closed information. The sensor 101 stores information obtained through sensing in the sensor information storing unit 102. The sensor information storing unit 102 is a storage device such as a memory.

The receiving unit 104 receives packets transmitted by another sensor terminal device 1. Here, packets received by the receiving unit 104 include a Hello packet used in path formation. A Hello packet is a packet that makes notification of the existence of the device that transmitted the Hello packet and is used for establishing and maintaining communication. In addition, the receiving unit 104 periodically receives path forming packets transmitted from other sensor terminal devices 1. Here, a Hello packet may be used as such a path forming packet.

The receiving unit 104 checks the destination of a received packet. At that time, the receiving unit 104 determines whether or not the received packet is a Hello packet. Then, the receiving unit 104 outputs the received packet to the reception sensitivity measuring unit 108. In addition, the receiving unit 104, in the case where the received packet is a signal whose destination is its own sensor terminal device, outputs the received signal to the data processing unit 103. In contrast to this, in the case where the destination of the received packet is another sensor terminal device 1, the receiving unit 104 outputs the received packet to the packet forwarding unit 107. In addition, in the case where the received packet is a Hello packet, the receiving unit 104 outputs the Hello packet to the reception sensitivity reading unit 111. In addition, in the case where a path forming packet has been received, the receiving unit 104 outputs the path forming packet to the path cost calculating unit 113 and the path determining unit 114. Here, in this embodiment, a case is described in which a path forming packet is periodically transmitted in order to keep renewing a path, but a path may be instead renewed using another method. For example, prior to transmitting a data packet including data, a path may be formed for each transmission of a data packet by transmitting a path forming packet to another sensor terminal device 1 on the network.

The data processing unit 103 receives a packet whose destination is its own sensor terminal device 1 from the receiving unit 104. The data processing unit 103 extracts data from the received packet and supplies the extracted data to an operator. In addition, the data processing unit 103 acquires sensor information stored in the sensor information storing unit 102. Then, the data processing unit 103 subjects the acquired sensor information to processing such as aggregation and outputs the processed sensor information to the packet generating unit 106.

The packet generating unit 106 receives the data including the sensor information from the data processing unit 103. Then, the packet generating unit 106 generates a packet including the sensor information. In addition, the packet generating unit 106 acquires information on the sensor terminal device 1 that is to be the transmission destination of the packet from the path storing unit 115, which will be described later. Then, the packet generating unit 106 outputs the generated packet to the transmitting unit 105 and issues an instruction to the transmitting unit 105 to transmit the output packet to the sensor terminal device 1 that is the transmission destination of the packet acquired from the path storing unit 115.

In addition, the packet generating unit 106 periodically generates a Hello packet. At such a time, if the packet generating unit 106 receives an instruction to add reception sensitivity information to a Hello packet from the reception sensitivity notifying unit 109, which will be described below, the packet generating unit 106 generate a Hello packet and adds thereto the reception sensitivity information received from the reception sensitivity notifying unit 109. Then, the packet generating unit 106 outputs the Hello packet to the transmitting unit 105 and issues an instruction to the transmitting unit 105 to transmit the Hello packet via broadcasting.

The packet forwarding unit 107 receives input of a packet addressed to another sensor terminal device 1 from the receiving unit 104. Then, the packet forwarding unit 107 acquires information on the sensor terminal device 1 that is to be the forwarding destination from the path storing unit 115 for the case where the packet is to be transmitted to a destination sensor terminal device 1. Then, the packet forwarding unit 107 outputs the received packet to the transmitting unit 105 and issues an instruction to the transmitting unit 105 to transmit the output packet to the sensor terminal device 1 that is the forwarding destination.

The transmitting unit 105 receives input of a packet from the packet generating unit 106 or the packet forwarding unit 107. In addition, the transmitting unit 105 receives input of information on the sensor terminal device 1 that is to be the transmission destination of a packet from the packet generating unit 106 or the packet forwarding unit 107, which is the transmission origin of the packet. The transmitting unit 105 then transmits the received packet to the sensor terminal device 1 that is the specified transmission destination. The receiving unit 104 and the transmitting unit 105 are equivalent to an example of a "communication unit".

Upon supply of power being started to its own sensor terminal device 1, the reception sensitivity measuring unit 108 starts measuring the reception power. When the receiving unit 104 receives a packet, the reception sensitivity measuring unit 108, for example, receives input of the packet from the receiving unit 104. The reception sensitivity measuring unit 108 measures the reception power of the received packet. In addition, when a packet is not being received, the reception sensitivity measuring unit 108 measures the reception power in a state where a packet is not being received. In addition, the reception sensitivity measuring unit 108 notifies the elapsed time measuring unit 110 of starting of measurement of the reception power caused by the supply of power. After that, the reception sensitivity measuring unit 108 receives notification from the elapsed time measuring unit 110 of the fact that the elapsed time from starting of measurement of reception power has exceeded a threshold. The reception sensitivity measuring unit 108 measures reception power until receiving from the elapsed time measuring unit 110 the notification that the elapsed time from starting of measurement of reception power has exceeded a threshold.

Figure 3:
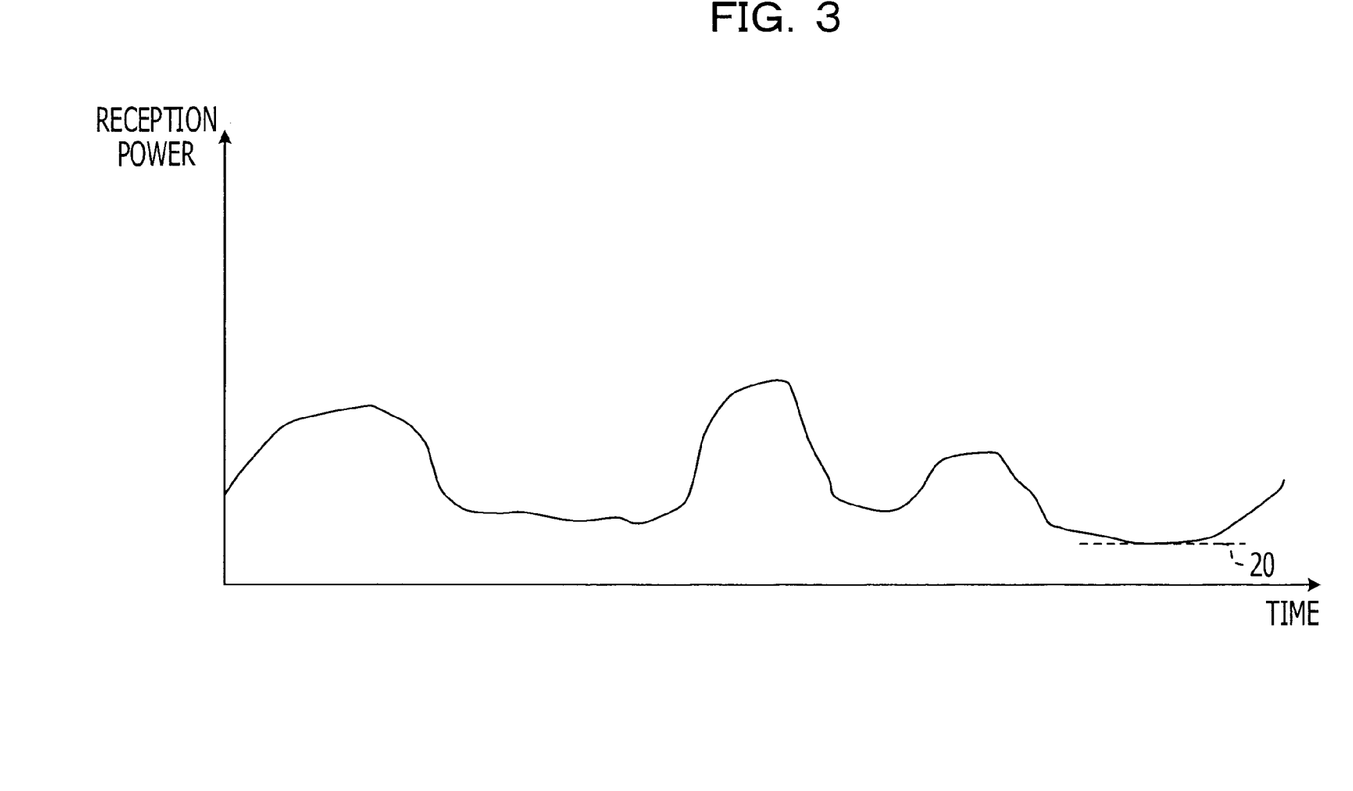
FIG. 3 is a diagram for explaining a method for determining reception sensitivity.

Then, the reception sensitivity measuring unit 108 acquires the value of the minimum reception power in the period until the elapsed time from after starting of power supply to the sensor terminal device 1 exceeded the threshold (hereafter, referred to as "minimum power"). The reception sensitivity measuring unit 108 sets the value of the minimum power as the reception sensitivity point. FIG. 3 is a diagram for explaining a method for determining the reception sensitivity point. In FIG. 3, the vertical axis represents reception power and the horizontal axis represents elapsed time. The reception sensitivity measuring unit 108 acquires a measured value of the reception power measured in the period of elapsed time from the start of measurement of reception power until the threshold was reached, as illustrated in FIG. 3. Then, upon acquiring the result of measurement of reception power illustrated in FIG. 3, the reception sensitivity measuring unit 108 sets the reception power indicated by the minimum value 20 as the reception sensitivity point. Here, the reception sensitivity point determined by the reception sensitivity measuring unit 108 is the minimum power and is different from the actual reception sensitivity point. However, in the case where reception power is minimum, the reception power can be thought of as not including a signal and just being noise, and thus the reception sensitivity point can be thought of as being the reception sensitivity. The reception sensitivity point determined by the reception sensitivity measuring unit 108 is equivalent to an example of "estimated reception sensitivity". Hereafter, measurement of reception power and acquisition of reception sensitivity point by the reception sensitivity measuring unit 108 may be sometimes referred to as "measurement of reception sensitivity".

The reception sensitivity measuring unit 108 outputs the value of the reception sensitivity point, that is, the value of the minimum power to the reception sensitivity notifying unit 109. Here, in this embodiment, the reception sensitivity measuring unit 108 determines to use the minimum power that occurs during the period until the elapsed time from after supply of power is started exceeds the threshold as the reception sensitivity point of its own sensor terminal device 1 and then after that does not update the reception sensitivity point. However, another method may be used instead. For example, a method may be used in which, while power is being supplied, the reception sensitivity measuring unit 108 continually measures reception power and each time it updates the minimum reception power, notifies the reception sensitivity notifying unit 109 of the updated value of the minimum power as the reception power.

The elapsed time measuring unit 110 includes a timer. In addition, the elapsed time measuring unit 110 has stored in advance a threshold for the time period for which measurement of reception power is to be performed. The elapsed time measuring unit 110 receives notification of starting of measurement of reception power from the reception sensitivity measuring unit 108. The elapsed time measuring unit 110 measures the elapsed time from starting of measurement of reception sensitivity by using its timer. When the elapsed time exceeds the stored in advance threshold, the elapsed time measuring unit 110 notifies the reception sensitivity measuring unit 108 of the fact that the elapsed time has exceeded the threshold. The reception sensitivity measuring unit 108 is equivalent to an example of a "reception sensitivity acquiring unit".

The reception sensitivity notifying unit 109 receives input of a value of minimum power, which is the reception sensitivity point, from the reception sensitivity measuring unit 108. The reception sensitivity notifying unit 109 outputs the value of minimum power, which is the reception sensitivity point, to the packet generating unit 106. In addition, the reception sensitivity notifying unit 109 instructs the packet generating unit 106 to add reception sensitivity information including the value of the reception sensitivity point to a Hello packet and then transmit the Hello packet.

The reception sensitivity reading unit 111 receives input of a Hello packet received from another sensor terminal device 1 from the receiving unit 104. The reception sensitivity reading unit 111 acquires discrimination information on the sensor terminal device 1 which is the transmission origin of the received Hello packet. Then, the reception sensitivity reading unit 111 acquires reception sensitivity information included in the received Hello packet. The reception sensitivity reading unit 111 outputs the reception sensitivity information and the discrimination information on the sensor terminal device 1 that transmitted that reception sensitivity information to the reception sensitivity storing unit 112.

The reception sensitivity storing unit 112 acquires the received reception sensitivity information and discrimination information on the sensor terminal device 1 corresponding to that reception sensitivity from the reception sensitivity reading unit 111. Then, the reception sensitivity storing unit 112 stores the value of the reception sensitivity point included in the received reception sensitivity information and the discrimination information on the sensor terminal device 1 in association with each other. In other words, the reception sensitivity storing unit 112 stores the value of the received reception sensitivity point as the reception sensitivity point of the sensor terminal device 1 corresponding to the received discrimination information. Since a Hello packet is transmitted from each sensor terminal device 1 in the surrounding area, the reception sensitivity storing unit 112 stores the reception sensitivity point of each sensor terminal device 1 in the surrounding area.

The path cost calculating unit 113 has stored in advance therein a requested Signal to Noise Ratio (SNR) that indicates a desired reception quality for a wireless communication scheme being used. A given value is allocated to the requested SNR in accordance with the wireless communication scheme.

The path cost calculating unit 113 receives input of a path forming packet from the receiving unit 104. Upon receiving the path forming packet, the path cost calculating unit 113 acquires discrimination information on the sensor terminal device 1, which the transmission origin of the received Hello packet, from the reception sensitivity reading unit 111. The path cost calculating unit 113 determines that the sensor terminal device 1 that is the transmission origin of the Hello packet is a sensor terminal device 1 with which communication is possible.

When looking for a path along which to transmit a packet to a certain sensor terminal device 1, the path cost calculating unit 113 calculates the number of hops of each path to that sensor terminal device 1. The path cost calculating unit 113 calculates the number of hops of each path to each sensor terminal device 1. Here, "path information" includes information on all of the sensor terminal devices 1 that a path passes though up to the desired sensor terminal device 1.

The path cost calculating unit 113 informs the path determining unit 114 of path information on each of the paths to each of the sensor terminal devices 1 and information on the number of hops of each of the paths.

The path determining unit 114 receives input of a path forming packet from the receiving unit 104. Upon receiving a path forming packet, the path determining unit 114 acquires discrimination information on the sensor terminal device 1 that is the transmission origin of the Hello packet and the value of the reception sensitivity point of each of the sensor terminal devices 1 from the reception sensitivity storing unit 112. Then, the path determining unit 114 calculates the requested reception power by adding together the value of the reception sensitivity point of the sensor terminal device 1 with which communication is possible and the requested SNR. The requested reception power indicates the reception power requested when communication is performed with that sensor terminal device 1 and is the received signal strength indicator (RSSI) for that sensor terminal device 1. The path determining unit 114 stores the requested reception power of each sensor terminal device 1 with which communication is possible.

Next, description will be given of a method of determining the transmission path of a packet performed by the path determining unit 114 using transmission of a packet to a certain sensor terminal device 1 as an example. Here, a certain sensor terminal device 1 that is to be the destination of a packet will be referred to as a "destination sensor terminal device 1". The path determining unit 114 receives input of path information on each path to the destination sensor terminal device 1 and information on the number of hops of each path from the path cost calculating unit 113. Then, the path determining unit 114 extracts sensor terminal devices 1 whose reception power exceeds a requested reception power from among sensor terminal devices 1 that are next to its own sensor terminal device 1 along each of the received paths.

Figure 4:
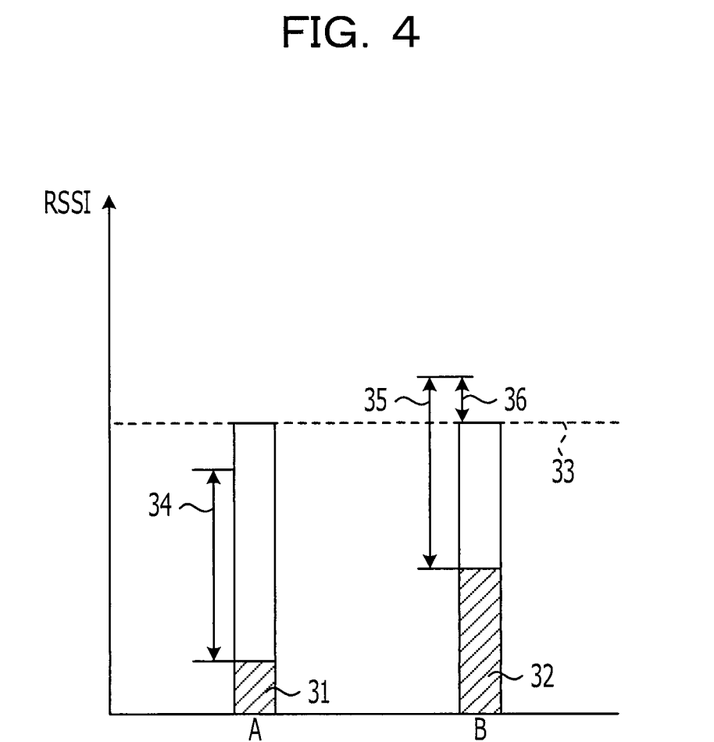
FIG. 4 is diagram for explaining a case in which bidirectional communication is performed using the same reception power between sensor terminal devices having different reception sensitivities.
Figure 5:
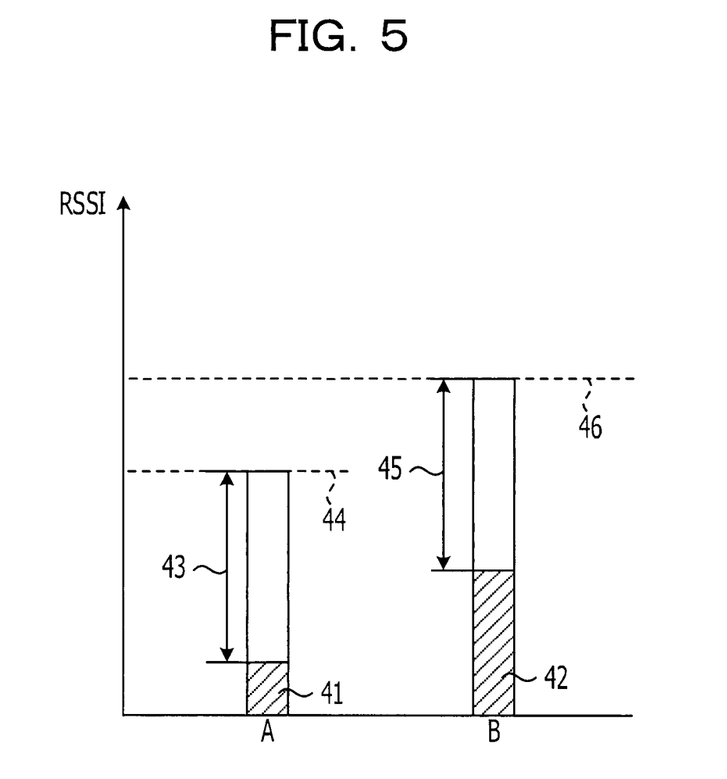
FIG. 5 is a diagram for explaining a case in which bidirectional communication is performed using a requested reception power.

Here, with reference to FIG. 4 and FIG. 5, description will be given of communication with a sensor terminal device whose reception power exceeds the requested reception power. FIG. 4 is diagram for explaining a case in which bidirectional communication is performed using the same reception power between sensor terminal devices having different reception sensitivities. FIG. 5 is a diagram for explaining a case in which bidirectional communication is performed using a requested reception power. In FIG. 4 and FIG. 5 the vertical axis represents RSSI. The horizontal axis represents sensor terminal devices 1 performing bidirectional communication. Here, description will be given of a case in which a sensor terminal device A and a sensor terminal device B perform communication with each other.

Reception sensitivity 31, which is a region indicated using diagonal lines in FIG. 4, represents the reception sensitivity of the sensor terminal device A. RSSI of the reception sensitivity 31 is a value of the reception sensitivity point of the sensor terminal device A. Reception sensitivity 32 indicates the reception sensitivity of the sensor terminal device B. RSSI of the reception sensitivity 32 is a value of the reception sensitivity point of the sensor terminal device B. In this case, the value of the reception sensitivity point of the sensor terminal device A is smaller than that of the sensor terminal device B. A small reception sensitivity point means that the reception sensitivity, that is, the ability to discriminate between signals is high. In the case where bidirectional communication is performed with the RSSI indicated by the value 33, in the sensor terminal device A, since the value 33 is larger than a value obtained by adding a requested SNR 34 to the reception sensitivity 31, communication from the sensor terminal device B to the sensor terminal device A is possible. Here, "adding a requested SNR to the reception sensitivity" means adding a value of the requested SNR to the value of the reception sensitivity point at that reception sensitivity. In contrast, in the sensor terminal device B, the value 33 is smaller than a value obtained by adding a requested SNR 35 to the reception sensitivity 32. In this case, the RSSI is insufficient to obtain the requested SNR 35 in the sensor terminal device B by the amount indicated by an arrow 36. Consequently, communication from the sensor terminal device A to the sensor terminal device B is difficult.

In contrast, in FIG. 5, communication is performed using requested reception powers obtained by adding requested SNR's to the values of reception sensitivity points of the sensor terminal devices A and B. In this case, communication is performed with RSSI 44 obtained by adding a requested SNR 43 to the reception sensitivity 41 of the sensor terminal device A. Consequently, communication is possible from the sensor terminal device B to the sensor terminal device A. In addition, communication is performed with RSSI 46 obtained by adding a requested SNR 45 to the reception sensitivity 42 of the sensor terminal device B. Consequently, communication from the sensor terminal device A to the sensor terminal device B is possible. That is, so long as a sensor terminal device extracted by the path determining unit 114 is a sensor terminal device whose reception power exceeds a requested reception power, it is possible to transmit a packet from the sensor terminal device to which the path determining unit 114 belongs to that sensor terminal device.

Then, the path determining unit 114 determines that a sensor terminal device 1, which is to be a transmission destination from its own sensor terminal device on a path having the smallest number of hops, will be the sensor terminal device next to its own sensor terminal device on the path to the destination sensor terminal device 1. Here, in the case where there are a plurality of paths having the smallest number of hops, the path determining unit 114 determines that the sensor terminal device 1 having the highest reception power among sensor terminal devices 1 that are candidates to be the next sensor terminal device with respect to its own sensor terminal device will be the next sensor terminal device with respect to its own sensor terminal device 1. The path determining unit 114 transmits information on the sensor terminal device 1 next to its own sensor terminal device to the path storing unit 115. The path cost calculating unit 113 and the path determining unit 114 are equivalent to an example of a "path selecting unit".

The path storing unit 115 acquires from the path determining unit 114 communication path information on paths to each of the sensor terminal devices 1, that is, information on the sensor terminal devices 1 next to its own sensor terminal device 1 on paths for the case where a packet is to be transmitted to the individual sensor terminal devices 1. The path storing unit 115 stores information on the communication paths to each of the sensor terminal devices 1.

Figure 6:
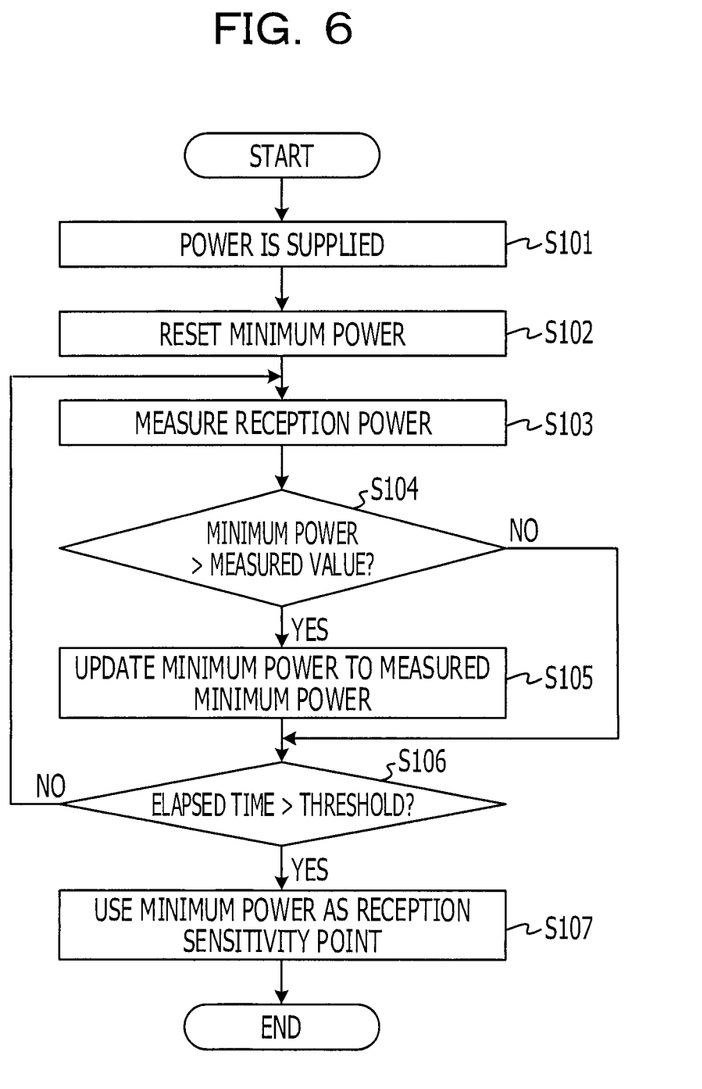
FIG. 6 is a flowchart of processing of determining reception power in the sensor terminal device according to Embodiment 1.

Next, the flow of processing of determining reception power in the sensor terminal device of this embodiment will be described with reference to FIG. 6. FIG. 6 is a flowchart of processing of determining reception power in the sensor terminal device according to Embodiment 1.

The sensor terminal device 1 receives supply of power (step S101).

The reception sensitivity measuring unit 108 resets the minimum power of its own sensor terminal device 1 (step S102). Here, "resets minimum power", for example, means setting a value of a certain given magnitude as the minimum power.

The reception sensitivity measuring unit 108 receives a packet transmitted from another sensor terminal device 1, measures the reception power and acquires the value of the reception sensitivity point as a measured value (step S103).

The reception sensitivity measuring unit 108 determines whether or not the measured value is lower than the minimum power (step S104). In the case where the measured value is lower than the minimum power (step S104: Yes), the reception sensitivity measuring unit 108 stores the measured minimum power as the minimum power so as to update the stored minimum power (step S105). In contrast, in the case where the measured value is higher than the minimum power (step S104: No), the reception sensitivity measuring unit 108 proceeds to step S106.

The reception sensitivity measuring unit 108 based on a notification from the elapsed time measuring unit 110, determines whether the elapsed time has exceeded a threshold (step S106). In the case where the elapsed time has not exceeded the threshold (step S106: No), the reception sensitivity measuring unit 108 returns to step S103.

In contrast, in the case where the elapsed time has exceeded the threshold (step S106: Yes), the reception sensitivity measuring unit 108 determines to use the stored minimum power as the reception sensitivity point (step S107).

As has been described above, the sensor terminal device according to this embodiment sets the minimum power of a packet received from a certain sensor terminal device within a given period as the reception sensitivity point of that certain sensor terminal device. In addition, the sensor terminal device according to this embodiment selects a transmission destination sensor terminal device to which a packet is to be transmitted to next from among sensor terminal devices whose reception powers exceed a requested reception power obtained by adding the value of a reception sensitivity point and a requested SNR to each other, and then selects a path. Thus, on a selected path, bidirectional communication between sensor terminal devices can be established with certainty and as a result a contribution can be made to improving the speed with which a network is formed.

Embodiment 2

Next, Embodiment 2 will be described. A sensor terminal device according to this embodiment differs from that of Embodiment 1 in that reception sensitivity is periodically measured. A block diagram of the sensor terminal device according to this embodiment is also illustrated by the block diagram of FIG. 2. Accordingly, hereafter, description will be mainly given of the function of periodically measuring reception sensitivity. In the following description, unless otherwise stated, it will be assumed that components having the same reference symbols as in Embodiment 1 have the same functions.

The reception sensitivity measuring unit 108, similarly to as in Embodiment 1, starts measuring reception power upon supply of power being started and measures reception power until the elapsed time from starting to measure reception power exceeds a threshold. Then, the reception sensitivity measuring unit 108 looks for the minimum power as a reception sensitivity point in the period until the elapsed time from starting of measurement of reception power exceeded the threshold, and notifies the reception sensitivity notifying unit 109 of the value of the reception sensitivity point.

After that, in this embodiment, the reception sensitivity measuring unit 108 periodically receives notification of arrival of reception power measurement timing from the elapsed time measuring unit 110. Then, upon receiving notification of arrival of measurement timing, the reception sensitivity measuring unit 108 starts measurement of the reception power and then measures the reception power until receiving notification from the elapsed time measuring unit 110 that the elapsed time from arrival of the measurement timing has exceeded a threshold. Then, the reception sensitivity measuring unit 108 sets the minimum power in the period until the elapsed time from arrival of the measurement timing exceeded the threshold as the reception sensitivity point of its own sensor terminal device 1 and newly stores and thereby updates the reception sensitivity point. Then, the reception sensitivity measuring unit 108 notifies the reception sensitivity notifying unit 109 of the value of the newly found reception sensitivity point.

The elapsed time measuring unit 110 has stored in advance therein a measurement timing measurement threshold, which is an elapsed period of time from after the previous measurement of reception power finished. The elapsed time measuring unit 110 measures elapsed time from after notifying the reception sensitivity measuring unit 108 of the fact that the elapsed time had exceeded the threshold. When the elapsed time exceeds the measurement timing measurement threshold, the elapsed time measuring unit 110 notifies the reception sensitivity measuring unit 108 of arrival of measurement timing. In addition, the elapsed time measuring unit 110 measures the elapsed time from the arrival of measurement timing. Then, when the elapsed time from the arrival of measurement timing exceeds the stored threshold, the elapsed time measuring unit 110 informs the reception sensitivity measuring unit 108 of this fact. Here, in this embodiment, the same value is used as the threshold of the elapsed time from after supply of power and measurement of the reception power are started and as the threshold of the elapsed time from the arrival of measurement timing, but instead different values can be used.

The reception sensitivity notifying unit 109 periodically receives input of a value of minimum power, which is the reception sensitivity point, from the reception sensitivity measuring unit 108. Then, the reception sensitivity notifying unit 109 periodically outputs the value of minimum power, which is the reception sensitivity point, to the packet generating unit 106. In addition, the reception sensitivity notifying unit 109 instructs the packet generating unit 106 to add reception sensitivity information to a Hello packet and then transmit the Hello packet.

The packet generating unit 106 periodically receives input of a value of a reception sensitivity point from the reception sensitivity notifying unit 109 and periodically transmits a Hello packet to which reception sensitivity information including the value of the reception sensitivity point has been added by broadcasting.

The reception sensitivity points of the other sensor terminal devices 1 stored by the reception sensitivity storing unit 112 are successively updated based on the Hello packets attached with the reception sensitivities periodically transmitted from the other sensor terminal devices 1.

The path determining unit 114 determines a path using the updated reception sensitivity points.

Next, referring to FIG. 7, description will be given of processing of periodically determining reception sensitivity of the sensor terminal device according to this embodiment.

Figure 7:
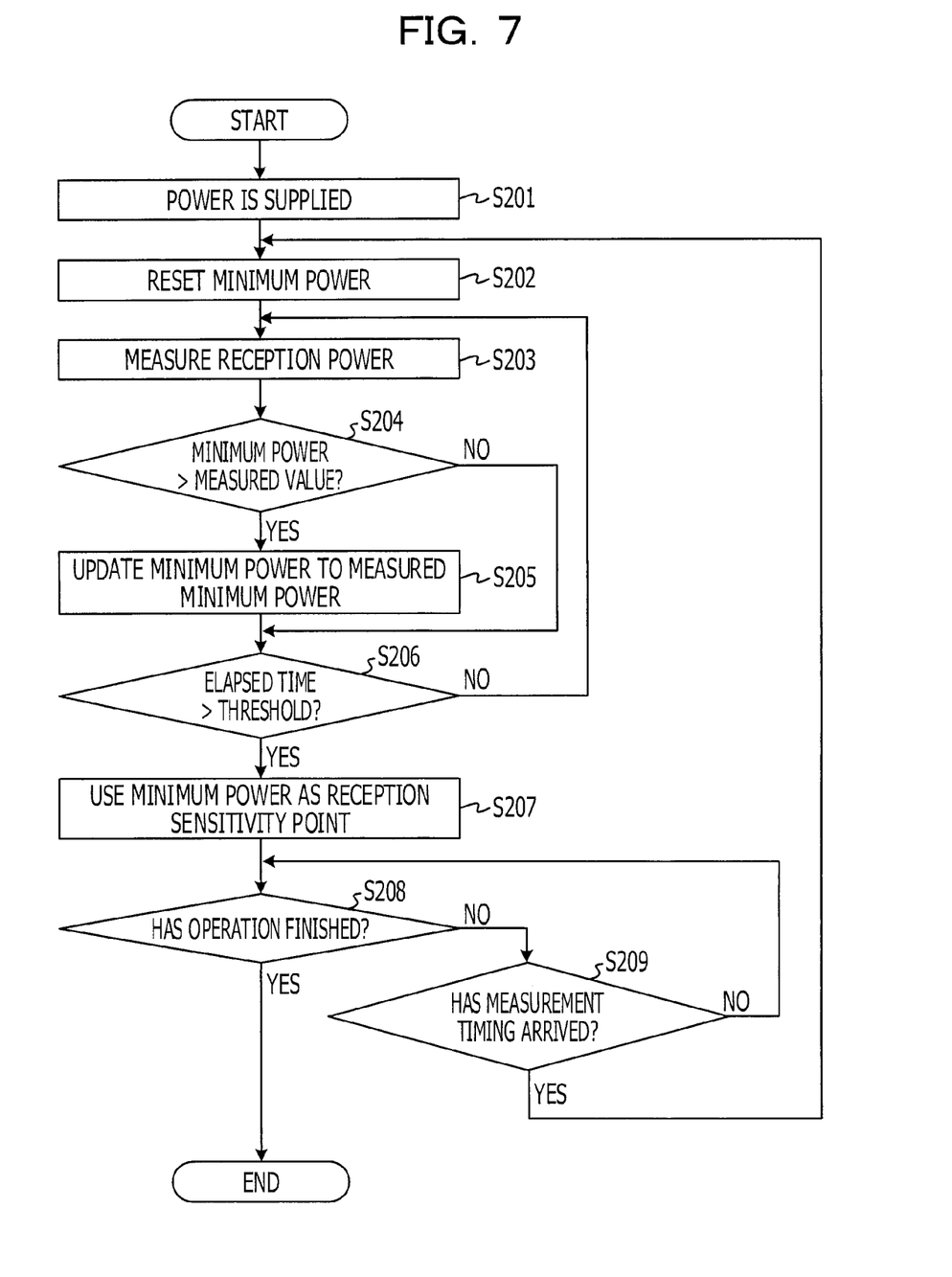
FIG. 7 is a flowchart of processing of periodically determining reception sensitivity of a sensor terminal device according to Embodiment 2.

FIG. 7 is a flowchart of processing of periodically determining reception sensitivity of a sensor terminal device according to Embodiment 2.

The sensor terminal device 1 receives supply of power (step S201).

The reception sensitivity measuring unit 108 resets the minimum power of its own sensor terminal device 1 (step S202).

The reception sensitivity measuring unit 108 receives a packet transmitted from another sensor terminal device 1, measures the reception power and acquires the value of the reception sensitivity point as a measured value (step S203).

The reception sensitivity measuring unit 108 determines whether or not the measured value is lower than the minimum power (step S204). In the case where the measured value is lower than the minimum power (step S204: Yes), the reception sensitivity measuring unit 108 stores the measured minimum power as the minimum power to update the stored minimum power (step S205). In contrast, in the case where the measured value is higher than the minimum power (step S204: No), the reception sensitivity measuring unit 108 proceeds to step S206.

Based on a notification from the elapsed time measuring unit 110, the reception sensitivity measuring unit 108 determines whether the elapsed time has exceeded a threshold (step S206). In the case where the elapsed time has not exceeded the threshold (step S206: No), the reception sensitivity measuring unit 108 returns to step S203.

In contrast, in the case where the elapsed time has exceeded the threshold (step S206: Yes), the reception sensitivity measuring unit 108 determines to use the stored minimum power as the reception sensitivity point (step S207).

In addition, the reception sensitivity measuring unit 108 determines whether operation of its own sensor terminal device 1 has finished (step S208). For example, the reception sensitivity measuring unit 108 determines that operation has finished in the case where the power supply has been turned off. In the case where operation has not finished (step S208: No), the reception sensitivity measuring unit 108 determines whether the measurement timing has arrived based on a notification from the elapsed time measuring unit 110 (step S209). In the case where the measurement timing has not yet arrived (step S209: No), the reception sensitivity measuring unit 108 returns to step S208. In contrast, in the case where the measurement timing has arrived (step S209: Yes), the reception sensitivity measuring unit 108 returns to step S202 and starts the next measurement of reception power.

On the other hand, in the case where operation has finished (step S208: Yes), the reception sensitivity measuring unit 108 finishes the processing of determining reception sensitivity.

As has been described above, the sensor terminal device according to this embodiment periodically measures its own reception sensitivity and then notifies the other sensor terminal devices 1 of information on its own reception sensitivity. Thus, the value of the reception sensitivity point stored by the sensor terminal devices being notified of information on reception sensitivity are periodically updated and therefore path selection can be performed using a more accurate reception sensitivity point when path selection is performed. Accordingly, bidirectional communication between sensor terminal devices can be established with more certainty and a contribution can be made to further improving the speed with which a network is formed.

Embodiment 3

Figure 8:
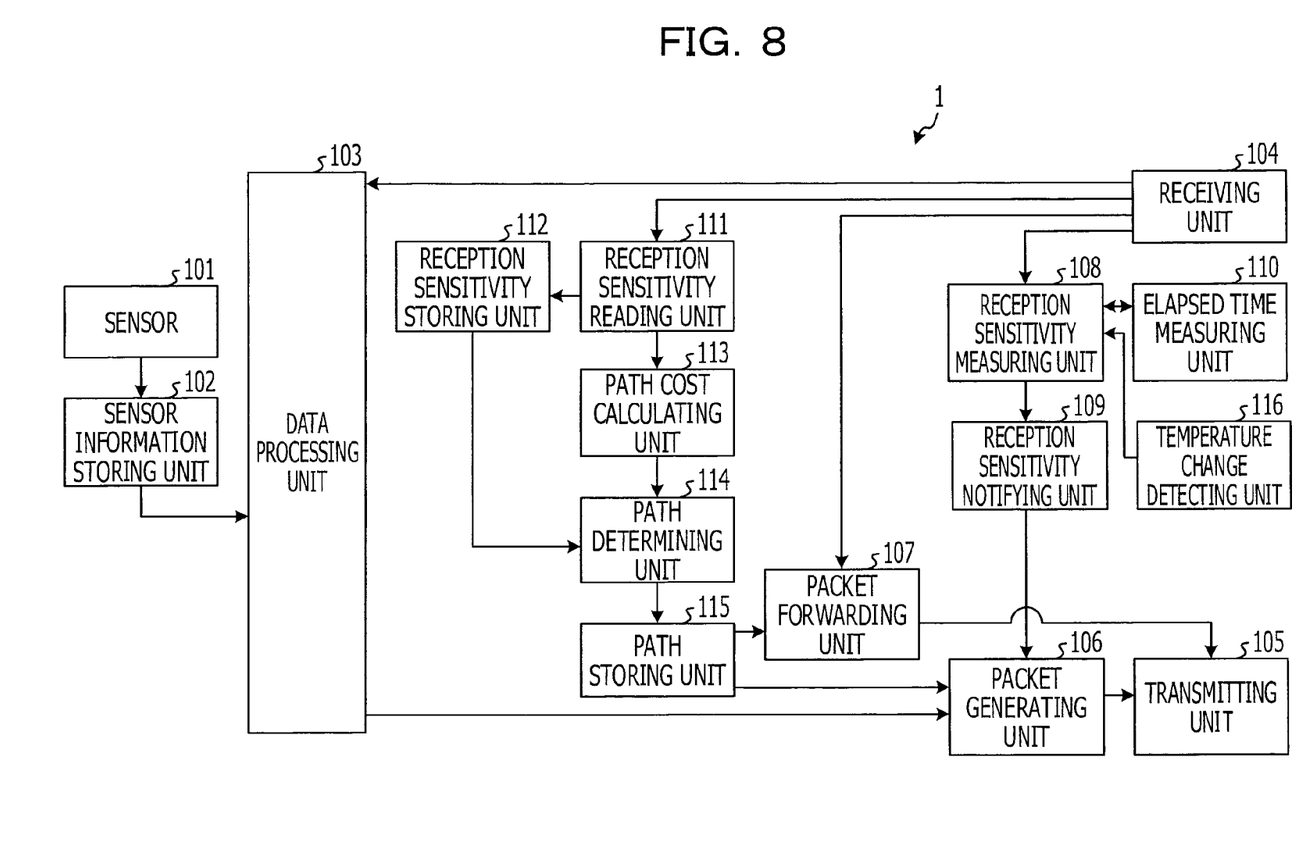
FIG. 8 is a block diagram of a wireless terminal device according to Embodiment 3.

Next, description will be given of a sensor terminal device according to Embodiment 3. A sensor terminal device according to this embodiment differs from those of Embodiments 1 and 2 in that reception sensitivity is re-measured when a change in temperature occurs. FIG. 8 is a block diagram of a wireless terminal device according to Embodiment 3. Embodiment 3 includes a temperature change detecting unit 116 in addition to the components of Embodiment 1. Hereafter, a function of measuring reception power based on a change in temperature will be mainly described. In the following description, unless otherwise stated, it will be assumed that components having the same reference symbols as in Embodiment 1 have the same functions.

The reception sensitivity measuring unit 108, similarly to as in Embodiment 1, starts measuring reception power upon supply of power being started and measures reception power until the elapsed time from starting of measurement of reception power exceeds a threshold. Then, the reception sensitivity measuring unit 108 looks for the minimum power as a reception sensitivity point in the period until the elapsed time from after starting of measurement of reception power exceeded the threshold, and notifies the reception sensitivity notifying unit 109 of the value of the reception sensitivity point.

Then, when a change in temperature equal to or greater than a given temperature threshold occurs, the reception sensitivity measuring unit 108 receives notification of the occurrence of a change in temperature from the temperature change detecting unit 116. Upon receiving notification of the occurrence of a change in temperature, the reception sensitivity measuring unit 108 starts measurement of reception power. In addition, the reception sensitivity measuring unit 108 notifies the elapsed time measuring unit 110 of the starting of measurement of reception power. Then, the reception sensitivity measuring unit 108 measures the reception power until receiving notification that the elapsed time from starting of measurement of reception power has exceeded a threshold from the elapsed time measuring unit 110. Then, the reception sensitivity measuring unit 108 sets the minimum power that occurred in the period until the elapsed time from starting of measurement of reception power, that is, the elapsed time from occurrence of a change in temperature exceeded the threshold as the reception sensitivity point of its own sensor terminal device 1 and newly stores and updates the reception sensitivity point. Then, the reception sensitivity measuring unit 108 notifies the reception sensitivity notifying unit 109 of the value of the newly found reception sensitivity point.

The elapsed time measuring unit 110 receives notification of starting of measurement of reception power from the reception sensitivity measuring unit 108 upon starting of supply of power or occurrence of a change in temperature. Then, the elapsed time measuring unit 110 measures elapsed time from starting of measurement of reception power. When the elapsed time from starting of measurement of reception power exceeds the stored threshold, the elapsed time measuring unit 110 notifies the reception sensitivity measuring unit 108 of this fact.

The temperature change detecting unit 116 includes a temperature sensor. In addition, the temperature change detecting unit 116 stores a temperature change threshold. The temperature change detecting unit 116 measures a change in temperature by using the temperature sensor. In the case where a change in temperature has occurred that exceeds the temperature change threshold, the temperature change detecting unit 116 notifies the reception sensitivity measuring unit 108 of the occurrence of the change in temperature. Hereafter, the occurrence of a change in temperature that exceeds the temperature change threshold will be simply referred to as "occurrence of a temperature change".

In the case where a change in temperature has occurred, the reception sensitivity notifying unit 109 receives input of a value of minimum power, which is a reception sensitivity point, from the reception sensitivity measuring unit 108. Then, the reception sensitivity notifying unit 109 outputs the value of the minimum power, which is the reception sensitivity, to the packet generating unit 106. In addition, the reception sensitivity notifying unit 109 instructs the packet generating unit 106 to add reception sensitivity information including the value of the reception sensitivity point to a Hello packet and then transmit the Hello packet.

In the case where a change in temperature has occurred, the packet generating unit 106 receives input of the reception sensitivity point from the reception sensitivity notifying unit 109 and periodically transmits, by broadcasting, a Hello packet to which reception sensitivity information including the reception sensitivity point has been added.

The reception sensitivity points of each of the other sensor terminal devices 1 stored in the reception sensitivity storing unit 112 are successively updated based on Hello packets attached with the reception sensitivity information transmitted when a change in temperature has occurred at the other sensor terminal devices 1.

The path determining unit 114 determines a path using the updated reception sensitivity points.

Figure 9:
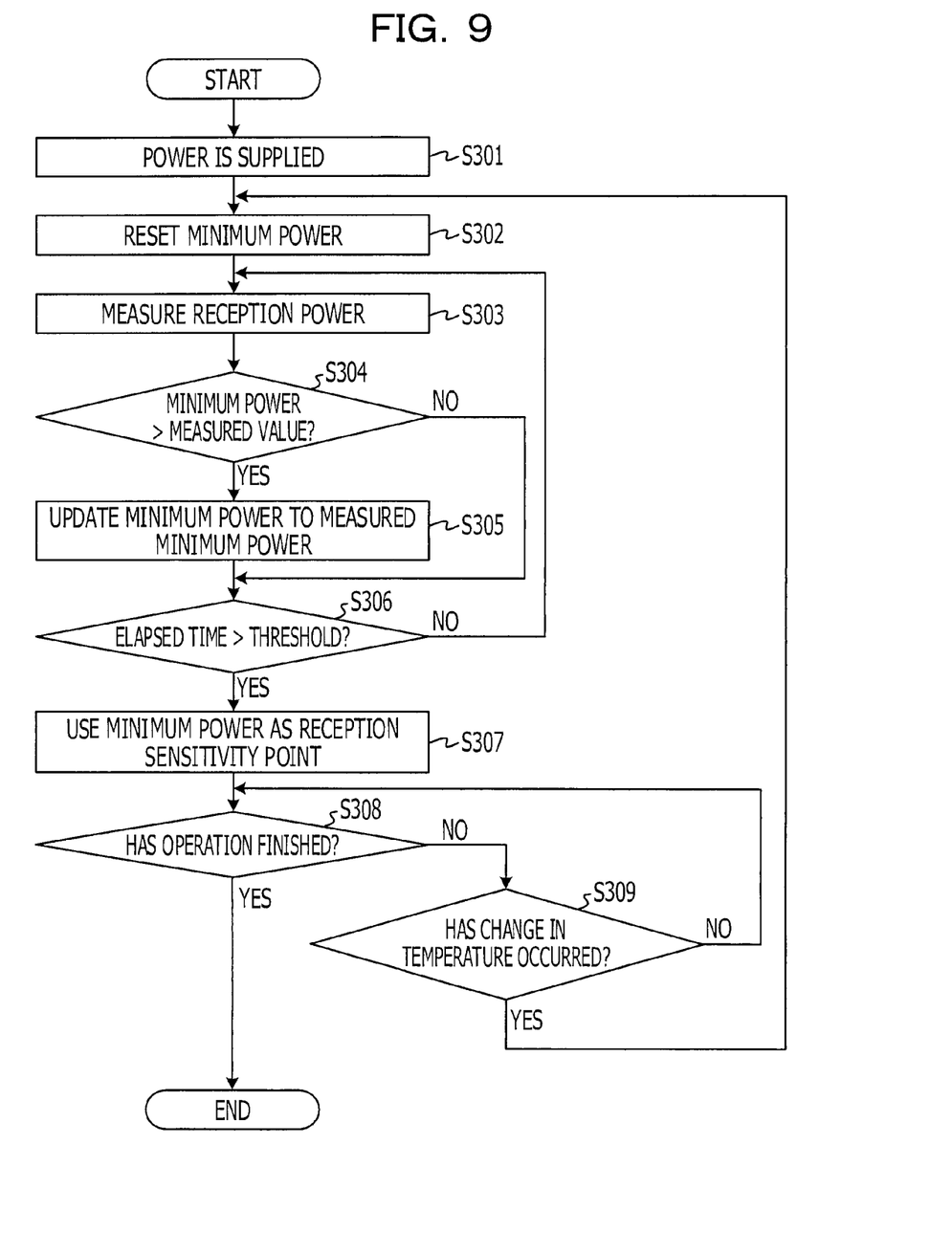
FIG. 9 is a flowchart of processing of periodically determining reception sensitivity of a sensor terminal device according to Embodiment 3.

Next, referring to FIG. 9, description will be given of processing of periodically determining the reception sensitivity of the sensor terminal device of this embodiment. FIG. 9 is a flowchart of processing of periodically determining the reception sensitivity of a sensor terminal device according to Embodiment 3.

The sensor terminal device 1 receives supply of power (step S301).

The reception sensitivity measuring unit 108 resets the minimum power of its own sensor terminal device 1 (step S302).

The reception sensitivity measuring unit 108 receives a packet transmitted from another sensor terminal device 1, measures the reception power and acquires the value of the reception sensitivity point as a measured value (step S303).

The reception sensitivity measuring unit 108 determines whether or not the measured value is lower than the minimum power (step S304). In the case where the measured value is lower than the minimum power (step S304: Yes), the reception sensitivity measuring unit 108 stores the measured minimum power as the minimum power to update the stored minimum power (step S305). In contrast, in the case where the measured value is higher than the minimum power (step S304: No), the reception sensitivity measuring unit 108 proceeds to step S306.

The reception sensitivity measuring unit 108 based on a notification from the elapsed time measuring unit 110, determines whether the elapsed time has exceeded a threshold (step S306). In the case where the elapsed time has not exceeded the threshold (step S306: No), the reception sensitivity measuring unit 108 returns to step S303.

In contrast, in the case where the elapsed time has exceeded the threshold (step S306: Yes), the reception sensitivity measuring unit 108 determines to use the stored minimum power as the reception sensitivity point (step S307).

In addition, the reception sensitivity measuring unit 108 determines whether operation of its own sensor terminal device 1 has finished (step S308). For example, the reception sensitivity measuring unit 108 determines that operation has finished in the case where the power supply has been turned off. In the case where operation has not finished (step S308: No), the reception sensitivity measuring unit 108 determines whether or not a change in temperature has occurred based on a notification from the temperature change detecting unit 116 (step S309). In the case where a change in temperature has not occurred (step S309: No), the reception sensitivity measuring unit 108 returns to step S308. In contrast, in the case where a change in temperature has occurred (step S309: Yes), the reception sensitivity measuring unit 108 returns to step S302 and starts the next measurement of reception power.

On the other hand, in the case where operation has finished (step S308: Yes), the reception sensitivity measuring unit 108 finishes processing of determining reception sensitivity.

As has been described above, in the case where a change in temperature has occurred, the sensor terminal device according to this embodiment measures its own reception sensitivity and re-notifies the other sensor terminal devices of its reception sensitivity point. Thus, in the case where a change in temperature has occurred at a certain sensor terminal device, the reception sensitivity point of that certain sensor terminal device stored in the other sensor terminal devices is updated. If a large change in temperature occurs, it is thought that there will be an effect on the reception sensitivity. Accordingly, path selection can be performed using more accurate reception sensitivities when path selection is performed. That is, bidirectional communication between sensor terminal devices can be established with more certainty and a contribution can be made to further improving the speed with which a network is formed.

In addition, in this embodiment, an example has been described in which re-measurement of reception sensitivity in the case where a change in temperature has occurred has been added to the configuration of Embodiment 1, but this modification can also be added to the configuration of Embodiment 2. Thus, path selection can be performed using more accurate reception sensitivities and a contribution to further improvement of the speed with which networks are formed can be made.

Hardware Configuration

Figure 10:
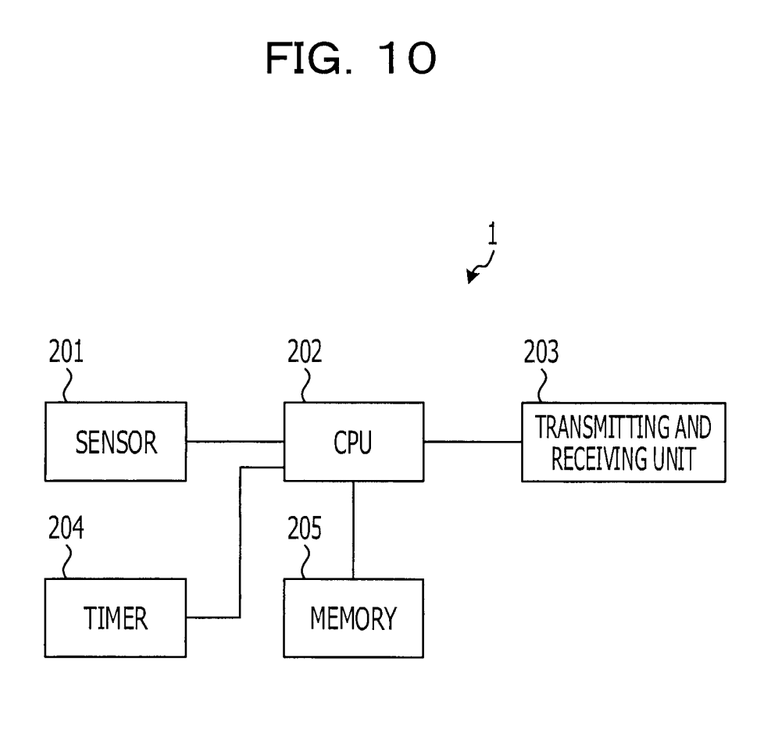
FIG. 10 is a diagram of the hardware configuration of a sensor terminal device.

FIG. 10 is a diagram of the hardware configuration of a sensor terminal device. As illustrated in FIG. 10, the sensor terminal device 1 of any of the above-described embodiments includes a sensor 201, a central processing unit (CPU) 202, a transmitting and receiving unit 203, a timer 204 and a memory 205.

The sensor 201, the transmitting and receiving unit 203, the timer 204 and the memory 205 are connected to the CPU 202 via a bus.

The sensor 201, for example, is a sensor whose purpose is to gather information in a sensor network such as a temperature sensor or a humidity sensor. In addition, the sensor 201 may be a temperature sensor that detects a change in temperature of the device into which it is incorporated. The function of, for example, the sensor 101 illustrated in FIG. 2 is realized. In addition, the CPU 202 and the sensor 201 realize the function of the temperature change detecting unit 116 illustrated in FIG. 8.

The transmitting and receiving unit 203, for example, includes an amplifier and a D/A converter. The transmitting and receiving unit 203, for example, realizes the functions of the receiving unit 104 and the transmitting unit 105 illustrated in FIG. 2.

The CPU 202 and the timer 204, for example, realize the function of the elapsed time measuring unit 110 illustrated in FIG. 2.

The CPU 202 and the memory 205 realize the functions of the data processing unit 103, the packet generating unit 106, the packet forwarding unit 107, the reception sensitivity measuring unit 108, the reception sensitivity notifying unit 109, the reception sensitivity reading unit 111, the path cost calculating unit 113, the path determining unit 114 and the path storing unit 115 illustrated in FIG. 2. Specifically, the memory 205 stores various programs such as programs that realize processing performed by the above-described units. The CPU 202 reads out and executes the programs stored in the memory 205, thereby realizing the functions of the above-described units.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless terminal device, comprising:
 a processor coupled to a memory, configured to:
 acquire an estimated reception sensitivity of the wireless terminal device based on reception powers from a plurality of other wireless terminal devices with which the wireless terminal device performs random access communication,
 notify the other wireless terminal devices of the estimated reception sensitivity of the wireless terminal device, and
 select a transmission destination from among the other wireless terminal devices based on requested reception powers of the other wireless terminal devices, the requested reception powers being calculated based on estimated reception sensitivities of the other wireless terminal devices notified from the other wireless terminal devices.

2. The wireless terminal device according to claim 1, wherein
 the processor is configured to set a minimum reception power among the reception powers as the estimated reception sensitivity.

3. The wireless terminal device according to claim 1, wherein
 the processor is configured to add a requested signal to noise ratio (SNR), which is a desired reception quality given in accordance with a communication scheme being used, to the estimated reception sensitivity of each of the other wireless terminal devices in order to calculate the requested reception power of each of the other wireless terminal devices.

4. The wireless terminal device according to claim 1, wherein
 the processor is configured to
 extract other wireless terminal devices for which the reception power exceeds the requested reception power, and
 select a transmission destination from among the extracted wireless terminal devices.

5. The wireless terminal device according to claim 1, further comprising:
 a temperature sensor, wherein
 the processor is configured to, in the case where a given change in temperature has been measured by the temperature sensor,
 measure the reception power for a given period of time, and set a minimum reception power that occurs within the given period of time as the estimated reception sensitivity.

6. The wireless terminal device according to claim 1, wherein
the processor is configured to
periodically measure the reception power for a given period of time, and
set a minimum reception power that occurs within the given period of time as the estimated reception sensitivity.

7. A wireless communication system comprising:
first wireless terminal devices; and
a second wireless terminal device that perform random access communication, wherein
each the first wireless terminal devices is configured to:
acquire an estimated reception sensitivity of the wireless terminal device based on reception powers from a plurality of other wireless terminal devices with which the wireless terminal device performs random access communication, and
notify the other wireless terminal devices of the estimated reception sensitivity of the wireless terminal device, and
the second wireless terminal device is configured to:
select a transmission destination from among the other wireless terminal devices based on requested reception powers of the other wireless terminal devices, the requested reception powers being calculated based on the estimated reception sensitivities of the first wireless terminal devices notified from the first wireless terminal devices.

8. A control method for a wireless terminal device, comprising:
acquiring an estimated reception sensitivity of the wireless terminal device based on reception powers from a plurality of other wireless terminal devices with which the wireless terminal device performs random access communication;
notifying the other wireless terminal devices of the acquired estimated reception sensitivity of the wireless terminal device; and
selecting, by a processor, a transmission destination from among the other wireless terminal devices based on requested reception powers of the other wireless terminal devices, the requested reception powers being calculated based on estimated reception sensitivities of the other wireless terminal devices notified from the other wireless terminal devices.

9. The control method according to claim 8, wherein
the acquiring includes setting a minimum reception power among the reception powers as the estimated reception sensitivity.

10. The control method according to claim 8, wherein
the selecting includes adding a requested signal to noise ratio (SNR), which is a desired reception quality given in accordance with a communication scheme being used, to the estimated reception sensitivity of each of the other wireless terminal devices in order to calculate the requested reception power of each of the other wireless terminal devices.

11. The control method according to claim 8, wherein
the selecting includes extracting other wireless terminal devices for which the reception power exceeds the requested reception power, and selecting a transmission destination from among the extracted wireless terminal devices.

12. The control method according to claim 8, further comprising:
measuring temperature by a temperature sensor, and wherein
the acquiring includes, in the case where a given change in temperature has been measured by the temperature sensor, measuring the reception power for a given period of time, and setting a minimum reception power that occurs within the given period of time as the estimated reception sensitivity.

13. The control method according to claim 8, wherein
the acquiring includes periodically measuring the reception power for a given period of time, and setting a minimum reception power that occurs within the given period of time as the estimated reception sensitivity.

* * * * *